US008874440B2

(12) United States Patent
Park et al.

(10) Patent No.: US 8,874,440 B2
(45) Date of Patent: Oct. 28, 2014

(54) APPARATUS AND METHOD FOR DETECTING SPEECH

(75) Inventors: Chi-youn Park, Suwon-si (KR); Nam-hoon Kim, Yongin-si (KR); Jeong-mi Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 317 days.

(21) Appl. No.: 12/761,489

(22) Filed: Apr. 16, 2010

(65) Prior Publication Data

US 2010/0268533 A1 Oct. 21, 2010

(30) Foreign Application Priority Data

Apr. 17, 2009 (KR) ........................ 10-2009-0033634

(51) Int. Cl.

| | |
|---|---|
| ***G10L 15/00*** | (2013.01) |
| ***G10L 25/78*** | (2013.01) |
| *G10L 25/24* | (2013.01) |
| *G10L 25/09* | (2013.01) |
| *G10L 25/90* | (2013.01) |
| *G10L 25/18* | (2013.01) |

(52) U.S. Cl.

CPC ................. *G10L 25/78* (2013.01); *G10L 25/24* (2013.01); *G10L 25/09* (2013.01); *G10L 25/90* (2013.01); *G10L 25/18* (2013.01)

USPC ........... 704/233; 704/246; 704/247; 704/251; 704/252

(58) Field of Classification Search

None

See application file for complete search history.

(56) References Cited

U.S. PATENT DOCUMENTS

| | | | | |
|---|---|---|---|---|
| 5,924,066 | A * | 7/1999 | Kundu | 704/232 |
| 7,725,316 | B2 * | 5/2010 | Chengalvarayan et al. | 704/234 |
| 8,131,543 | B1 * | 3/2012 | Weiss et al. | 704/233 |
| 2004/0044525 | A1 * | 3/2004 | Vinton et al. | 704/224 |
| 2004/0064314 | A1 | 4/2004 | Aubert et al. | |
| 2005/0246171 | A1 * | 11/2005 | Nakatsuka | 704/239 |
| 2006/0155537 | A1 * | 7/2006 | Park et al. | 704/243 |

(Continued)

FOREIGN PATENT DOCUMENTS

| | | |
|---|---|---|
| JP | 2004-272201 | 9/2004 |
| JP | 2005-181459 | 7/2005 |

(Continued)

OTHER PUBLICATIONS

Yong Duk Cho et al., "Improved Voice Activity Detection Based on a Smoothed Statistical Likelihood Ratio," *In Proceedings of the 2001 IEEE International Conference on Acoustics, Speech, and Signal Processing* (*ICASSP '01*) 2001, vol. 2, IEEE, Salt Lake City, Utah, USA, pp. 737-740.

(Continued)

*Primary Examiner* — Leonard Saint Cyr

(74) *Attorney, Agent, or Firm* — NSIP Law

(57) ABSTRACT

A speech detection apparatus and method are provided. The speech detection apparatus and method determine whether a frame is speech or not using feature information extracted from an input signal. The speech detection apparatus may estimate a situation related to an input frame and determine which feature information is required for speech detection for the input frame in the estimated situation. The speech detection apparatus may detect a speech signal using dynamic feature information that may be more suitable to the situation of a particular frame, instead of using the same feature information for each and every frame.

22 Claims, 6 Drawing Sheets

(56) References Cited

U.S. PATENT DOCUMENTS

| | | | | |
|---|---|---|---|---|
| 2006/0287856 | A1 * | 12/2006 | He et al. | 704/256 |
| 2007/0225972 | A1 * | 9/2007 | Kim | 704/210 |
| 2008/0010057 | A1 * | 1/2008 | Chengalvarayan et al. | 704/9 |
| 2008/0077404 | A1 | 3/2008 | Akamine et al. | |

FOREIGN PATENT DOCUMENTS

| | | |
|---|---|---|
| JP | 2008-076730 | 4/2008 |
| JP | 2008-145988 | 6/2008 |
| JP | 2008-197463 | 8/2008 |
| KR | 10-2006-0082465 | 7/2006 |
| KR | 10-2008-0002990 | 1/2008 |
| WO | WO 2006/116132 | 11/2006 |

OTHER PUBLICATIONS

Masakiyo Fujimoto et al., "Noise Robust Voice Activity Detection Based on Statistical Model and Parallel Non-linear Kalman Filtering," *In Proceedings of the 2007 IEEE International Conference on Acoustics, Speech, and Signal Processing* (*ICASSP 2007*), Apr. 15-20, 2007, vol. 4, IEEE, Honolulu, Hawaii, USA, pp. IV-797-IV-800.

Eric A. Hansen et al., "Solving POMDPs by Searching in Policy Space," in *Proceedings of the 14th Conference on Uncertainty in Artificial Intelligence* (*UAI '98*), Jul. 24-26, 1998, Morgan Kaufmann Publishers Inc., San Francisco, CA, USA, pp. 211-219.

Kentaro Ishizuka et al., "Noise Robust Front-end Processing with Voice Activity Detection based on Periodic to Aperiodic Component Ratio," *In Proceedings of the 8th Annual Conference of the International Speech Communication Association* (*Interspeech 2007*), Aug. 27-31, 2007, pp. 230-233.

"A Silence Compression Scheme for G.729 Optimized for Terminals Conforming to Recommendation V.70," *ITU-T Recommendation G.729 Annex B*, Nov. 1996, pp. 1-23.

Jia-lin Shen, "Robust Entropy-based Endpoint Detection for Speech Recognition in Noisy Environments," *In Proceedings of the International Conference on Spoken Language Processing*, 1998, pp. 1-4.

Jongseo Sohn et al., "A Statistical Model-Based Voice Activity Detection," *IEEE Signal Processing Letters*, Jan. 1999, pp. 1-3, vol. 6, No. 1, IEEE Signal Processing Society.

* cited by examiner

FIG.5

510

| SUBSEQUENT / PREVIOUS | SPEECH | NON-SPEECH |
|---|---|---|
| SPEECH | 0.98 | 0.02 |
| NON-SPEECH | 0.05 | 0.95 |

SPEECH/NON-SPEECH DETERMINATION IS MADE BY ACTION VARIABLE

520

| SUBSEQUENT / PREVIOUS | SPEECH | NON-SPEECH |
|---|---|---|
| SPEECH | 1.00 | 0.00 |
| NON-SPEECH | 0.00 | 1.00 |

SPEECH/NON-SPEECH DETERMINATION IS NOT MADE BY ACTION VARIABLE

APPARATUS AND METHOD FOR DETECTING SPEECH

CROSS REFERENCE TO RELATED APPLICATION(S)

This application claims the benefit under 35 U.S.C. §119(a) of Korean Patent Application No. 10-2009-0033634, filed on Apr. 17, 2009, the entire disclosure of which is incorporated herein by reference for all purposes.

BACKGROUND

1. Field

The following description relates to speech detection, and more particularly, to an apparatus and method for detecting speech to determine whether an input signal is a speech signal or a non-speech signal.

2. Description of the Related Art

Generally, voice activity detection (VAD) algorithms may be used to extract a section of speech from a signal that includes a mix of speech and non-speech sections. VAD extracts feature information such as energies and changes in energy of an input signal at various time intervals, for example, every 10 ms, and divides the signal into speech sections and non-speech sections based on the extracted feature information. For example, according to G.729, which is one example of an audio codec standard, a speech section is detected using energies extracted, a low-band energy, and a zero crossing rate (ZCR). The payload size for G.729 is 20 ms. Therefore, the G.729 standard may extract energies, low-band energy, and ZCR from a signal during a time interval of 20 ms, and detect a speech section from the signal.

A system for speech detection extracts feature information with respect to individual frames, and determines whether each frame includes speech based on the extracted feature information. For example, feature information such as the energy of the signal or a ZCR of the signal may be used to detect speech from an unvoiced speech signal. Unlike a voiced speech signal that has periodicity useful to the speech detection, an unvoiced speech signal does not have periodicity. Feature information used to detect speech may differ with the type of noise signal. For example, it may be difficult to detect speech using periodicity information when music sounds are input as noise. Therefore, feature information, for example, spectral entropy or a periodic/aperiodic component ratio, which is generally less affected by noise, may be extracted, and may be used. Also, a noise level or a feature of noise may be estimated, for example, by a noise estimation module, and a model or parameters may be changed, according to the estimated information.

SUMMARY

In one general aspect, provided is a speech detection apparatus including a feature extracting unit to extract feature information from a frame containing audio information, an internal state determining unit to determine an internal state with respect to the frame based on the extracted feature information, wherein the internal state includes a plurality of state information each indicating a state related to speech, and an action determining unit to determine, based on the internal state, an action variable indicating at least one action related to speech detection of the frame, and to control speech detection according to the action variable.

The internal state may include probability information that indicates whether the frame is speech or non-speech and the action variable includes information that indicates whether to output a result of speech detection according to the probability information or to use the feature information for speech detection of the frame.

The internal state determining unit may extract new feature information from the frame using the feature information according to the action variable, may accumulate the extracted new feature information with feature information previously extracted, and may determine the internal state based on the accumulated feature information.

When the internal state indicates that the current frame is determined as either speech or non-speech, and the accuracy of the determination is above a preset threshold, the action determining unit may determine the action variable to update a data model that indicates at least one of speech features of individuals and noise features, and is taken as a reference for extracting the feature information by the feature extracting unit.

the plurality of state information may include at least one of speech state information indicating a state of a speech signal of the frame, environment information indicating environmental factors of the frame, and history information for data related to speech detection.

The speech state information may include at least one of information indicating the presence of a speech signal, information indicating a type of a speech signal, and a type of noise.

The environment information may include at least one of information indicating a type of noise background where a particular type of noise constantly occurs and information indicating an amplitude of a noise signal.

The history information may include at least one of information indicating a speech detection result of recent N frames and information of a type of feature information that is used for the recent N frames.

The internal state determining unit may update the internal state using at least one of a resultant value of the extracted feature information, a previous internal state for the frame, and a previous action variable.

The internal state determining unit may use an internal state change model and an observation distribution model in order to update the internal state, the internal state change model indicates a change in internal state according to each action variable, and the observation distribution model indicates observation values of feature information which are used according to a value of the each interval state.

The action variable may include at least one of information indicating the use of new feature information different from previously used feature information, information indicating a type of the new feature information, information indicating whether to update a noise model and/or a speech model representing human speech features usable for feature information extraction, and information indicating whether to generate an output based on a feature information usage result for the frame, the output indicating whether or not the frame is a speech section.

In another aspect, provided is a speech detection method including extracting feature information from a frame, determining an internal state with respect to the frame based on the extracted feature information, wherein the internal state includes a plurality of state information each indicating a state related to speech, determining an action variable according to the determined internal state, the action variable indicating at least one action related to speech detection of the frame, and controlling speech detection according to the action variable.

The internal state may include probability information that indicates whether the frame is speech or non-speech and the action variable may include information that indicates whether to output a result of speech detection according to the probability information or to use the feature information for speech detection of the frame.

The plurality of state information may include at least one of speech state information indicating a state of a speech signal of the frame, environment information indicating environmental factors of the frame, and history information including data related to speech detection.

The speech state information may include at least one of information indicating the presence of a speech signal, information indicating a type of a speech signal, and a type of noise.

The environmental information may include at least one of information indicating a type of noise background where a particular type of noise constantly occurs and information indicating an amplitude of a noise signal.

The history information may include at least one of information indicating a speech detection result of recent N frames and information of a type of feature information that is used for the recent N frames.

The determining of the internal state may include updating the internal state using at least one of a resultant value of the extracted feature information, a previous internal state for the frame, and a previous action variable.

In the determining of the internal state, an internal state change model and an observation distribution model may be used to update the internal state, the internal state change model indicates a change in internal state according to each action variable, and the observation distribution model indicates observation values of feature information that are used according to a value of the each internal state.

The action variable may include at least one of information indicating the use of new feature information different from previously used feature information, information indicating a type of the new feature information, information indicating whether to update a noise model and/or a speech model representing human speech features usable for feature information extraction, and information indicating whether to generate an output based on a feature information usage result, the output indicating whether or not the frame is a speech section.

Other features and aspects will be apparent from the following detailed description, the drawings, and the claims.

BRIEF DESCRIPTION OF THE DRAWINGS

FIG. 5 is a diagram illustrating examples of state change models of speech probability information.

Figure 1:
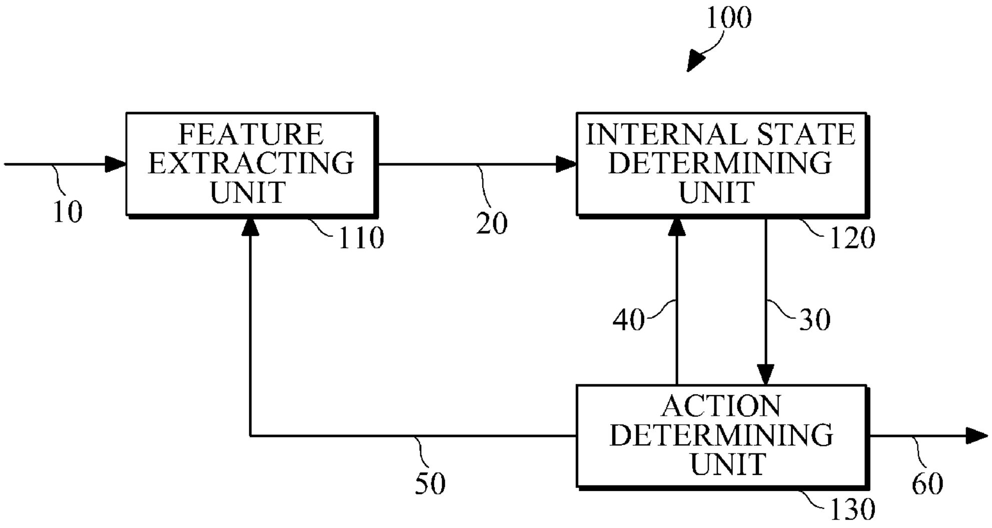
FIG. 1 is a diagram illustrating an example of a speech detection apparatus.

Throughout the drawings and the detailed description, unless otherwise described, the is same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and structures may be omitted for increased clarity and conciseness.

FIG. 1 illustrates an example of a speech detection apparatus. The speech detection apparatus 100 may receive a frame 10 of a sound signal of a predetermined length and at a predetermined time interval, and determine whether the input frame 10 is a speech signal. The speech detection apparatus 100 may be implemented as a computing device of various types, for example, a computer, a mobile terminal, and the like.

In the example shown in FIG. 1, the speech detection apparatus 100 includes a feature extracting unit 110, an internal state determining unit 120, and an action determining unit 130. The configuration of the speech detection apparatus 100 may be modified in various ways. For example, the speech detection apparatus 100 may further include a microphone (not shown) to receive a sound signal, a speaker to output a sound signal, and the like. The feature extracting unit 110 may receive and/or convert the sound signal into frames 10.

The feature extracting unit 110 is configured to extract feature information. The feature extracting unit 110 may extract feature information included in the input frame 10. The extracted feature information is used as an input 20 to the internal state determining unit 120.

The internal state determining unit 120 may use the feature information to determine an internal state including state information related to speech, and the determined internal state may be used as input information 30 for the action determining unit 130. For example, the state information may include at least one of speech state information indicating a state of a speech signal of a frame, environment information indicating environmental elements of the frame, and history information of data related to speech detection, a combination thereof, and the like. A value indicating the internal state may be used as an input to a voice recognition module to improve voice recognition performance. For example, a model of a voice recognizer may be changed depending on a type of noise or and intensity of noise. In some embodiments, voice recognition may be performed in response to the situations where a noise signal is too large or small or where the volume of the voice is not loud enough.

The action determining unit 130 determines an action variable for the determined internal state. The action variable indicates at least one action involved with speech detection, according to the determined internal state information that is input as input information 30. The action determining unit 130 controls the speech detection process according to the action variable. The determined action variable may be used as input information 40 for the internal state determining unit 120 and may be information that includes the internal state.

The action variable may contain information that indicates whether to output a result of speech detection, or that indicates if a current frame is a speech section or a non-speech section, based on the result of usage of feature information applied in the current frame. If it determined that the current frame is a speech section or a non-speech section, the action variable may represent the determination as output activity.

When it is unclear whether the current frame is a speech or a non-speech section, the action variable may include information informing whether new feature information will be used for the current frame and/or the type of new feature information that will be used for the current frame. The new feature information may include information that is different from previously used feature information. For example, the feature extracting unit 110 may extract different feature information from the current frame according to action variable input information 50 received from the action determining unit 130.

The action variable may contain, for example, request information for updating a data model used by the feature extracting unit 110. For example, the action variable may include information that indicates whether a data model, such as a noise model and/or a speech model will be updated. The noise models and/or the speech models may represent human vocal features that may be taken as reference for feature information extraction.

Figure 2:
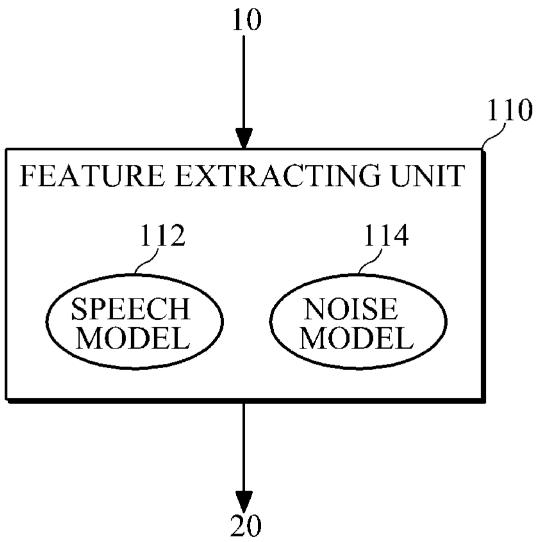
FIG. 2 is a diagram illustrating an operation of an example feature extracting unit that may be included in the speech detection apparatus of FIG. 1.

FIG. 2 illustrates an operation of an example feature extracting unit that may be included in the speech detection apparatus of FIG. 1.

In this example, the feature extracting unit 110 extracts feature information specified by the action variable from a current frame. Referring to FIG. 1, the extracted feature information is used as input information 20 for the internal state determining unit 120. Features that may be extracted by the feature extracting unit 110 include, for example, energy of the current frame, energy of a particular frequency band (e.g., from 100 to 400 Hz and from 1000 to 2500 Hz), Mel-Frequency Cepstral coefficients, a zero crossing rate (ZCR), and periodicity information, and the like.

The feature information may be affected by noise. The influence due to the noise on the feature information may be removed using a speech model 112 and/or a noise model 114, which are present in the system. While the example shown in FIG. 2 includes one speech model 112 and one noise model 114, any desired amount of models may be used. For example, one or more speech models and/or one or more noise models may be included in the system. In some embodiments only one or more speech models are included. In some embodiments, only one or more noise models are included.

The speech model 112 may consist of data that represents speech characteristics of individuals, and the noise model 114 may consist of data that represents noise characteristics according to one or more types of noise. The speech model 112 and the noise model 114 may be used to increase the accuracy of the speech detection, and may be stored in the feature extracting unit 110 or an external storage unit.

The feature extracting unit 110 may use a likelihood ratio value as the feature information, instead of information extracted from the current frame. The likelihood ratio value may indicate whether a current frame is more likely speech or noise using the speech model 112 and/or the noise model 114. For example, the feature extracting unit 110 may subtract energy of a noise signal from energy of a current signal, or subtract energy of the same frequency band as a noise signal from energy of a predetermined frequency band, and use resultant information to process feature information extracted from the current frame.

In some embodiments, the feature extracting unit 110 may additionally use feature information extracted from a video signal or an input signal captured by a motion sensor, as well as the feature information which may be extracted from the speech signal, and determine information about the probability that the current frame is a speech signal.

Figure 3:
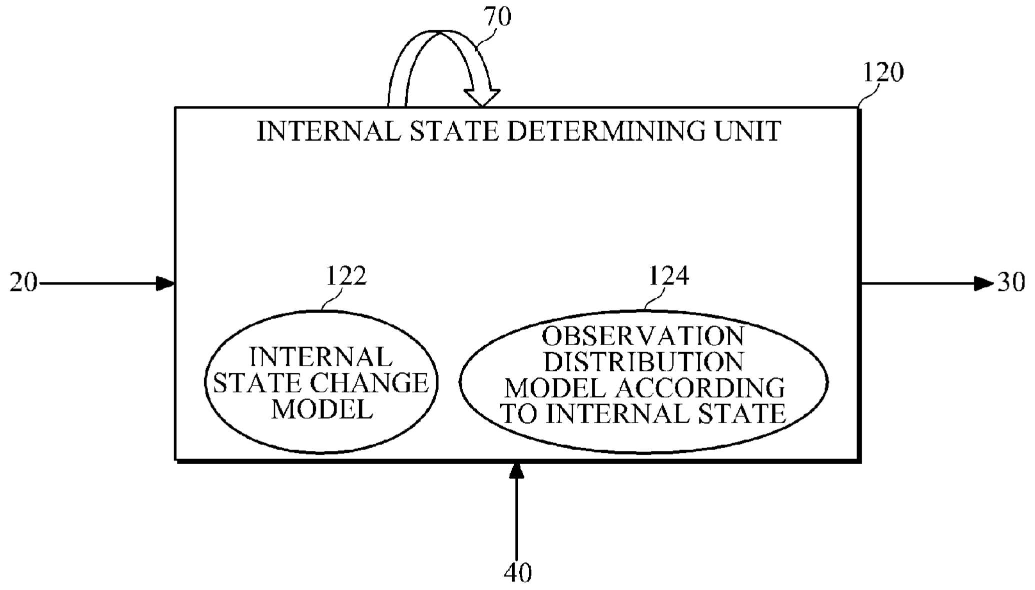
FIG. 3 is a diagram illustrating an operation of an example internal state determining unit that may be included in the speech detection apparatus of FIG. 1.

FIG. 3 illustrates an operation of an example internal state determining unit that may be included in the speech detection apparatus of FIG. 1.

The internal state determining unit 120 may use information to determine an internal state with respect to a frame, and the internal state includes state information indicating states related to speech. The internal state is information recorded internally to determine an action variable. For example, the internal state may be a current state estimated based on input information different from information existing in an input frame.

For example, the internal state determining unit 120 may record the probability of the existence of a speech signal and a type of background noise as the internal state. For example, an estimation may be made that the probability of existence of a speech signal is 60% and the probability that music is input as the background noise is above a preset threshold in a current situation. The estimation result may be provided as output information 20 to the action determining unit 130. The action determining unit 130 may use output information 20 to set an action variable to activate an activity for measuring a zero crossing rate (ZCR) and transmit the setting result as input information to the feature extracting unit 110 to extract the ZCR.

The internal state determining unit 120 may record the internal state in categories, for example, a speech state, environment information, history information, and the like. Examples of a speech state category, environment information category, and history information category are further described below.

(1) Speech State

The speech state indicates a state of a speech signal in a current frame. According to the probability of a state value, the action determining unit 130 may perform an activity to determine speech/non-speech.

Speech state information may contain information about whether a speech signal exists in the frame, a type of the speech signal, and a type of noise.

The existence of a speech signal is state information that indicates whether speech is present in a current frame or the frame consists of only non-speech signals.

Speech signals may be further classified into categories such as voiced/non-voiced speech, consonants and vowels, plosives, and the like. Because the distribution of feature information extracted from the speech signal may vary according to the type of the speech signal, setting the type of the speech signal as the internal state may result in more accurate speech detection.

A particular type of noise may occur more frequently than any other types of noise in a situation where a speech detection system is employed. In this example, anticipated types of noise, for example, such noise types as the sound of breathing, the sounds of buttons, and the like, may be set as internal state values, thereby obtaining more accurate detection result. For example, there may be five state values indicating voiced speech and non-voiced speech with respect to a speech signal.

For example, in a silent state, the sound of breathing, the sound of buttons being pressed, and the like, may correspond to non-voiced speech.

(2) Environment Information

The environment information is state information indicating environmental factors of an input signal. Generally, environmental factors which do not significantly vary with time may be set as the internal state, and the internal state determines a type of feature information.

Where a particular type of noise is anticipated, such noise environment may be set as an internal state value. For example, the type of noise environment may indicate a general environmental factor that differs from a type of noise of the speech state that indicates a characteristic distribution of noise for a short period of time. For example, environments such as inside a subway, in a home, and on a street, and the like, may be set as the state values.

If a parameter corresponding to the amplitude of a noise signal such as signal-to-noise ratio (SNR) is set as an internal state value, activities may be taken for noise signals. The activities may include different amplitudes. For example, when the SNR is above a preset threshold, speech/non-speech detection may be performed with a small amount of information, and when the SNR is lower than a preset threshold, speech/non-speech detection may be performed after a sufficient amount of information is obtained.

(3) History Information

The history information is state information that records recent responses of the speech detection apparatus 100. The speech detection apparatus 100 includes the history information in the internal state. By including the history information in the internal state, the internal state may have influence on the action determining unit 130 for controlling activities related to speech detection. The history information may include a voice activity detection (VAD) result of recent N frames and feature information observed in the recent N frames.

The internal state determining unit 120 internally records outputs from previous N frames, such that output of VAD determined by the action variable of the action determining unit 130 may be prevented from abruptly changing.

The internal state determining unit 120 may record feature information observed in the recent N frames as internal state information for the action determining unit 130. An action variable determination result may allow the feature information obtained from the previous N frames to be directly applied to a subsequent frame.

The internal state determining unit 120 may extract new feature information from a frame according to an action variable, accumulate the extracted new feature information with previously extracted feature information, and determine the internal state information that indicates whether the frame is speech or non-speech using the accumulation result.

The internal state determining unit 120 may determine the internal state based on previous state probabilities 70 that indicate a previous internal state. The internal state determining unit 120 may determine the internal state based on previous action variable 40 and the newly input feature information 10. Each state value of the internal state may not be set as an explicit value, but may be probability information.

In other words, if a variable of the internal state can have two types of values, for example, speech and non-speech, the internal state determining unit 120 may determine the value of the variable as 80% of speech and 20% of non-speech, thereby managing an uncertain situation. When the internal state variable is $S_n$ at a nth step, the above example may be represented by the following Equation 1:

$$P(S_n=\text{speech})=0.8,\ P(S_n=\text{non-speech})=0.2. \quad (1)$$

The internal state determining unit 120 may update the state value of the internal state based on a model 122 of internal state change according to each action variable (hereinafter, referred to as an "internal state change model"). The internal state determining unit 120 may update the state value of the internal state based on a model 124 of observation distribution according to each state value (hereinafter, referred to as an "observation distribution model").

The internal state change model 122 may vary with the action variable. For example, as shown in FIG. 4, VAD history information which records VAD results of five recent frames may have an internal state change model which differs with action variables.

Figure 4:
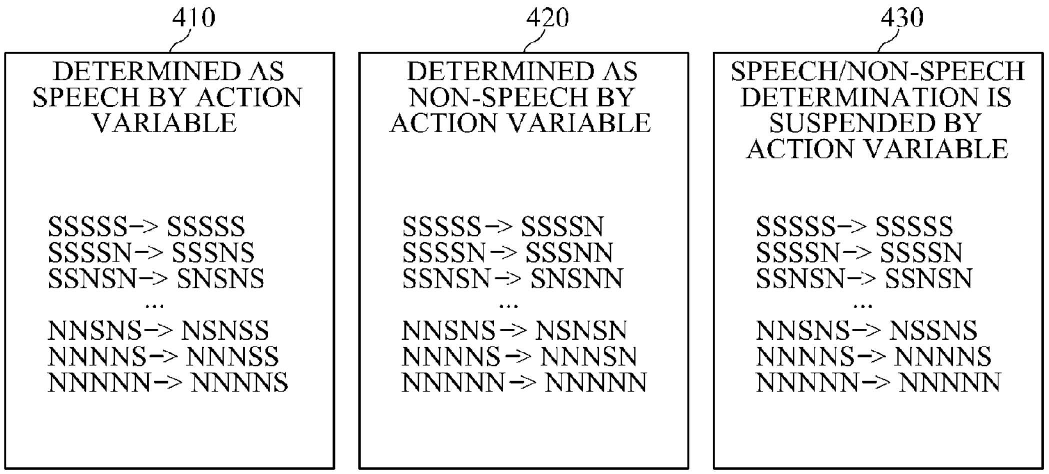
FIG. 4 is a diagram illustrating examples of voice activity detection (VAD) history state change models.

FIG. 4 illustrates examples of VAD history state change models. The VAD history state change models may be illustrated according to action variables.

In the example shown in FIG. 4, "S" denotes a speech state, and "N" denotes a non-speech state. In the example where an action variable determines speech 410 or non-speech 420, the status change may occur such that the determination is included as the last value of the VAD history state. In the example where the action variable does not determine either speech or non-speech 430, for example, where the action variable determines a noise model update or additional extraction of feature information, the VAD history state may stay the same.

When the state represents speech or non-speech, a state change model in a probability manner as shown in FIG. 5 may be constructed.

FIG. 5 illustrates examples of state change models of speech probability information. The state change models of speech probability information may be illustrated according to action variables.

Referring to FIG. 5, speech probability information of a subsequent frame is shown in table 510 when VAD determination is performed for a current frame. For example, if the state of the previous frame is speech, state changes may occur such that the probability that the subsequent frame is speech may be 98% and the probability that the subsequent frame is non-speech may be 2%. In another example, if the state of a previous frame is non-speech, the probability that the subsequent frame is speech may be 5% and the probability that the subsequent frame is non-speech may be 95%.

If VAD determination is not made by the action variable in a previous step, for example, if the action variable indicates noise model update or additional feature information extraction with respect to a currently processed frame, the same process may be performed on the current frame in a subsequent step, and state change does not occur as shown in table 520.

Where $S_n$ denotes a state value in an nth step and $A_n$ denotes an action variable value which is output in an nth state, a state change model reflecting a state value and a action variable value at an (n-1)th step may be expressed as the following Equation 2:

$$P(S_n|S_{n-1},A_{n-1}). \quad (2)$$

For example, if the speech detection apparatus 100 uses an internal state change model, even when information at the current frame is uncertain or false information is input due to noise, the uncertainty of the current frame may be corrected based on information obtained from a previous frame.

For example, if the probability that the current frame is speech is 50% when a conclusion is made based on information of the current frame, it may be difficult to determine whether speech is present without additional information. However, in the case of a speech signal, generally there is no speech or non-speech of a length of one or two frames, and the internal state change model may maintain a condition as shown in Table 1:

TABLE 1

| | Speech | Non-speech |
|---|---|---|
| Speech | 0.9 | 0.1 |
| Non-speech | 0.2 | 0.8 |

In an example using the state change model of Table 1, when the probability of a previous frame being speech is determined to be 90%, a priori probability of a current frame being speech may be 83% and is obtained by Equation 3 below:

$$\begin{aligned} P(F_n = \text{Speech}) = {} & P(F_n = \text{Speech} \mid F_{n-1} = \text{Speech}) \\ & P(F_{n-1} = \text{Speech}) + \\ & P(F_n = \text{Speech} \mid F_{n-1} = \mathit{NonSpeech}) \\ & P(\mid F_{n-1} = \mathit{NonSpeech}) \\ = {} & 0.9 \times 0.9 + 0.2 \times 0.1 \\ = {} & 0.83. \end{aligned} \tag{3}$$

Thus, posteriori probability may be calculated as 83% by adding information (probability of 50%) of the current frame to the priori probability. As such, using the internal state change model 122, insufficient information in the current frame can be complemented by the information of the previous frames.

When uncertain information is contiguously input, the state change model may accumulate the input information, and may make a more accurate decision on the uncertain information.

For example, if a frame is determined as speech with a probability of 60% when information of each frame is individually used, according to the above state change model, the probability of the presence of speech may be determined as 60% if there is no additional information in the first frame, and the priori probability may be determined to be 62% in a subsequent frame using information of a previous frame as illustrated below by Equation 4:

$$\begin{aligned} P(F_n = \text{Speech}) = {} & P(F_n = \text{Speech} \mid F_{n-1} = \text{Speech}) \\ & P(F_{n-1} = \text{Speech}) + \\ & P(F_n = \text{Speech} \mid F_{n-1} = \mathit{NonSpeech}) \\ & P(F_{n-1} = \mathit{NonSpeech}) \\ = {} & 0.9 \times 0.6 + 0.2 \times 0.4 \\ = {} & 0.62. \end{aligned} \tag{4}$$

Using Equation 4, the probability of the presence of speech may be calculated to be 66% using information of the current frame. The calculation may be repeatedly performed in the same manner, and the probability of the presence of speech may be computed as 75% for a subsequent frame, and may be computed as 80% for a next subsequent frame, and the prior information may be accumulated to provide higher determination accuracy for a subsequent frame.

The internal state change model 122 indicates a probability of an internal state changing regardless of the input 20 of a feature information value. Therefore, to update the internal state according to an input signal, a distribution model with respect to information observation according to each state value may be used, for example, the observation distribution model 124 according to each state value may be used.

When an observation value, which is a feature information extraction result in an nth step, is given as $0_n$, the observation distribution model 124 may be expressed as shown in Equation 5:

$$P(O_n|S_n,A_{n-1}). \tag{5}$$

In this example, $A_{n-1}$ is for reflecting a previous action variable that determines a type of feature information to be observed.

Figure 6:
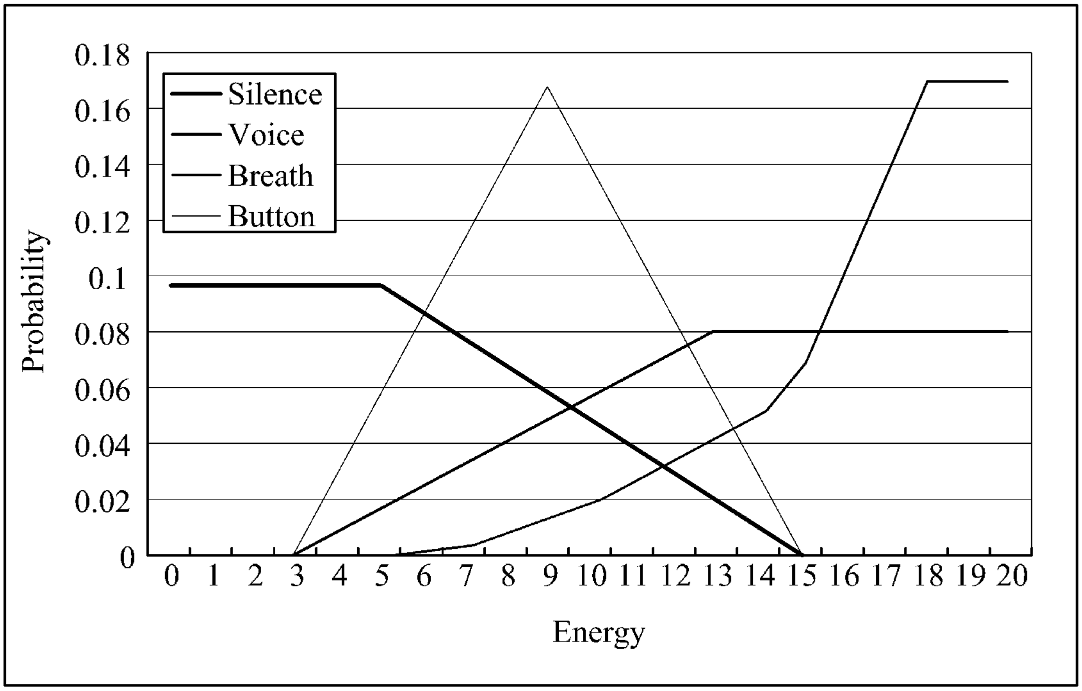
FIG. 6 is a graph illustrating an example of a distribution model of observation values.

For example, when a previous action variable requests observing energy, a distribution model of values observed according to the internal state as illustrated in FIG. 6 may be used.

FIG. 6 is a graph that illustrates a distribution model of observation values. The observation values are energy feature information extraction results according to the internal state.

In the example of FIG. 6, the speech state has four values including "voice," "silence," "breathing," and "button." The distribution model for each observation value requested by the previous action variable may be obtained manually or may be calculated from data.

Supposing values possible to be internal state values are given by $S=\{s_1, s_2, s_3, \ldots, s_n\}$ based on the internal state change model 122 according to each action variable and the observation distribution model 124, a probability of the value being the internal state value may be updated using Equation 6:

$$P(S_n = s_i) \propto P(O_n \mid S_n = s_i, A_{n-1}) \sum_{s \in S} P(S_n = s_i \mid S_{n-1} = s, A_{n-1}) P(S_{n-1} = s). \tag{6}$$

According to Equation 6, if an action variable $A_{n-1}$ in a previous step, a probability $S_{n-1}$, of an internal state value in the previous step and an observation value $O_n$ obtained in a current step are given, the probability $S_n$ of an internal state value newly updated in the current step may be calculated.

Figure 7:
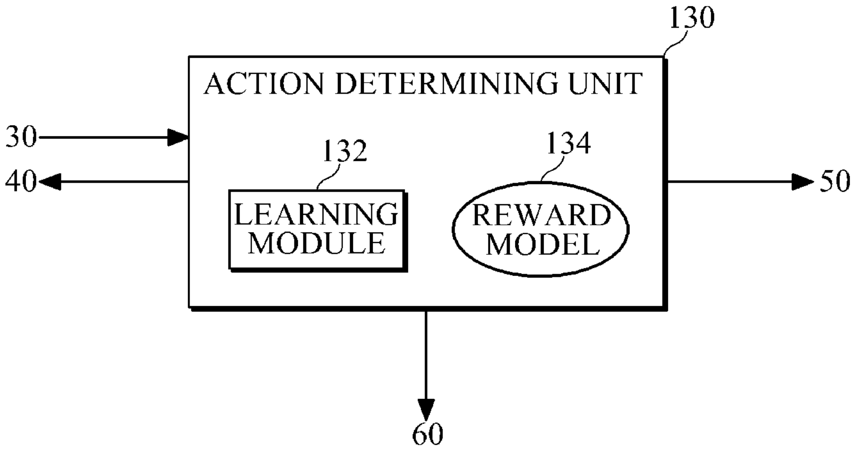
FIG. 7 is a diagram illustrating an example of an action determining unit that may be included in the speech detection apparatus of FIG. 1.

FIG. 7 illustrates an example of an action determining unit that may be included in the speech detection apparatus of FIG. 1.

The action determining unit 130 determines an action variable that indicates at least one activity related to speech detection of a frame, according to a determined internal state value. Although a function between an internal state and an action variable may be designed manually, such a method may not be suitable for a large model representing an internal state. For example, the action determining unit 130 may use a learning model designed using a reinforcement learning model such as a partially observable Markov decision process (POMDP).

In this example, the action variable may be expressed by a function of a probability of the internal state as shown in Equation 7:

$$A(P(s_1),P(s_2), \ldots, P(s_n)). \tag{7}$$

A POMDP, uses information including, an internal state change model, an observation distribution model for each internal state, and a reward model for each action.

The internal state change model and the observation distribution are described above, thus a description of these two models is omitted. The reward model 134 may be expressed as shown in Equation 8:

$$R(S_n, A_n). \tag{8}$$

The reward model 134 represents how suitable each action is for a current state. For example, if an internal state is one of "voice", "silent", "breathing", and "button", and an action variable determined by the action determining unit 130 is one of "speech determination", "non-speech determination," "low-frequency energy information request," and "periodicity information request," a compensation model may be designed as shown in the example below in Table 2:

TABLE 2

| R(S, A) | Speech | Non-speech | Low frequency | Periodicity |
|---|---|---|---|---|
| Voice | 10 | −50 | −1 | −1 |
| Silent | −10 | 10 | −1 | −1 |
| Breathing | −10 | 10 | −1 | −1 |
| Button | −10 | 10 | −1 | −1 |

In the example shown in Table 2, when the internal state value is "voice," speech determination results in a 10-point reward and non-speech determination results in a 50-point deduction. In the same manner, when the internal state is "non-voice" such as "breathing" or "button pressing," speech determination results in a 10-point deduction and non-speech determination results in a 10-point reward.

In the example reward model of Table 2, more points are deducted for non-speech determination because determining non-speech for the "voice" state may cause more loss than determining speech for a non-speech state. In addition, the reward model may be designed to deduct one point for all actions other than speech/non-speech determination, for example, the low-frequency energy request and the periodicity information request. A delay in determination leads to a decrease in reward, so that the action determining unit 130 may be motivated to find an appropriate action variable more promptly. The reward model 134 may be configured manually in a desired speech detection system when the speech detection apparatus 100 is manufactured.

The action determining unit 130 may determine an optimal action variable that maximizes a reward predicted through the POMDP using one or more of the above-described three models. The action determining unit 130 may input newly updated probabilities of internal state to an action determination function through the above models and determine an action output from the action determination function as a new action variable.

For example, the action determining function obtained through a POMDP may be given together with the rewards shown in Table 3 below. In the example shown in Table 3, the internal state may be one of "voice", "silent", "breathing" and "button".

TABLE 3

| Voice | Silent | Breathing | Button | Action |
|---|---|---|---|---|
| −66 | 141 | 138 | 157 | Non-speech determination |
| −35 | 140 | 129 | 156 | Non-speech determination |
| 147 | −18 | −62 | −24 | Speech determination |
| 151 | −152 | −182 | −257 | Speech determination |
| 137 | 77 | 30 | 49 | Additional information |
| 63 | 129 | 124 | 142 | Additional information |

In this example, an action value in a row which maximizes the inner product between probabilities of the respective state values and rewards in each row is determined as the action variable $A_n$. A reward at an $i^{th}$ row and a $j^{th}$ column is represented as $T_{ij}$ and $T_i$ denotes an action value in an $i^{th}$ row. An action variable may be expressed as shown in Equation 9:

$$A_n = T_{IND} \tag{9}$$

where $$T_{IND} = \underset{i}{\operatorname{argmax}} \sum_j T_{i,j} P(S_n = s_j).$$

For example, probabilities of a current state may be computed as shown in Table 4 below:

TABLE 4

| Voice | Silent | Breathing | Button |
|---|---|---|---|
| 0.3 | 0.5 | 0.1 | 0.1 |

For example, the inner product between the probabilities of the current state and the first row of Table 3 is 0.3*(−66)+0.5*141+0.1 *138+0.1*157=80.2, and the inner product between the probabilities of the current state and the second row is 88. Sequentially, the inner products are 26.5, −74.6, 87.5, and 110. Thus, the inner product of the last row has the highest value, and accordingly the action variable of a current frame is determined as "additional information request".

As described above, the action determining unit 130 determines the action variable based on the internal state, and the types of the actions as action variables may include speech/non-speech decision, speech model update, noise model update, and additional information request.

(4) Speech/Non-speech Decision

The action determining unit 130 may determine whether a signal of a current frame includes speech, and generate an action variable indicating the result of determination. The result of determination is included in an output 60 of VAD.

The action variables generated by the action determining unit 130 may have two values including speech and non-speech, or alternatively may have three values including speech, non-speech, and suspension. When the action determining unit 130 cannot determine the action variable based on information of the current frame, the action may be set as "suspension" and then be determined later by post-processing.

(5) Speech and Noise Model Update

The action determining unit 130 may decide whether a speech model and/or a noise model uses a signal of the current frame, and may generate an action variable that indicates the decision. The action determining unit 130 outputs an action variable to the feature extracting unit 110. The action variable may be used to update a speech model and/or a noise model, and the feature extracting unit 110 performs the update.

The feature extracting unit 110 may update a speech model when a frame is determined as speech according to the VAD result, and update a noise model when a frame is determined as non-speech. If an initial determination is incorrect, the speech or noise model is updated based on the wrong determination result, and incorrect determination is repeatedly made in accordance with the model wrongly updated, which may result in an accumulation of errors.

Hence, in one implementation, the action determining unit 130 may set an action variable such that update of a speech model or a noise model is suspended when a frame cannot be clearly determined as either speech or non-speech and the update may be performed only when the frame can be determined as speech or non-speech with a predetermined level of certainty. That is, the timing for updating the speech or noise model may be determined using an action variable.

In the example action determination scheme through POMDP, as shown in Table 5, the action determining unit 130 deducts more points when an action of updating a speech model or a noise model is wrongly taken, so that the speech model or the noise model may be updated only when the frame is determined as either speech or non-speech with a predetermined level of certainty.

TABLE 5

| | Action | | | |
|---|---|---|---|---|
| | Speech detection | | Model update | |
| State | Speech | Non-speech | Speech model update | Noise model update |
| Speech | 10 | −10 | 10 | −100 |
| Non-speech | −10 | 10 | −100 | 10 |

(6) Additional Information Request

When the action determining unit 130 cannot determine a frame as speech or non-speech based on information obtained up to present, the action determining unit 130 may generate and output an action variable that requests additional information. In response to the generated action variable, the feature extracting unit 110 may extract feature information, which may be different than previously used feature information, from the current frame and generate an observation value according to the extracted feature information.

Furthermore, the action variable may add an action for requesting additional parameters. By doing so, with respect to an undetermined frame, an action may be taken to request additional information to the frame itself or an adjacent frame. Consequently, by using the speech detection apparatus 100, it is possible to determine which feature information is most effective for speech detection based on the internal state.

Figure 8:
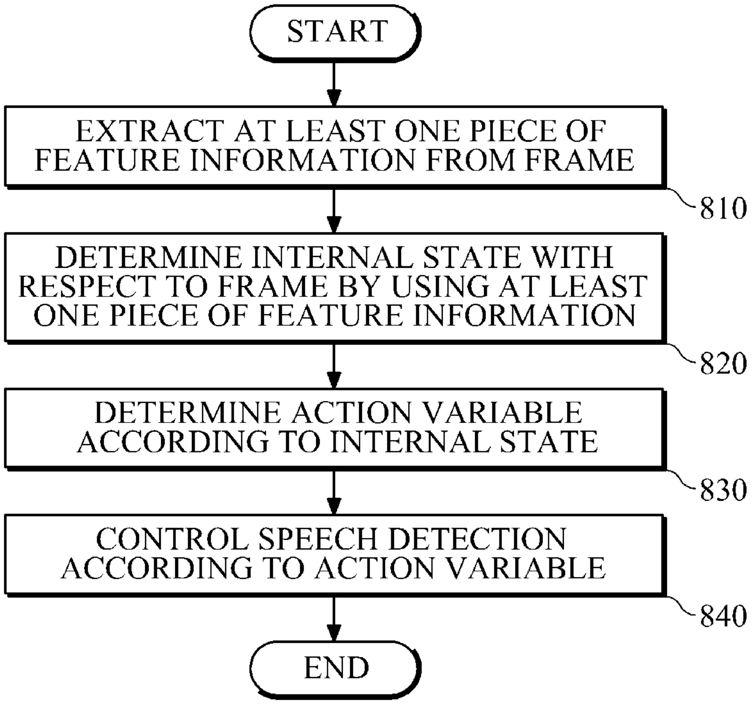
FIG. 8 is a flowchart illustrating an example of a speech detection method.

FIG. 8 is a flowchart that illustrates an example of a speech detection method.

Referring to FIG. 1 and FIG. 8, in operation 810, the feature extracting unit 110 extracts feature information from a frame generated from an audio signal. In operation 820, the internal state determining unit 120 uses the feature information and determines an internal state of the frame, which includes a plurality of state information indicating states related to speech.

In operation 830, the action determining unit 130 determines an action variable, which indicates at least one action related to speech detection from the frame, according to the determined internal state. In operation 840, the action determining unit 130 outputs the action variable to control a speech detection action.

Figure 9:
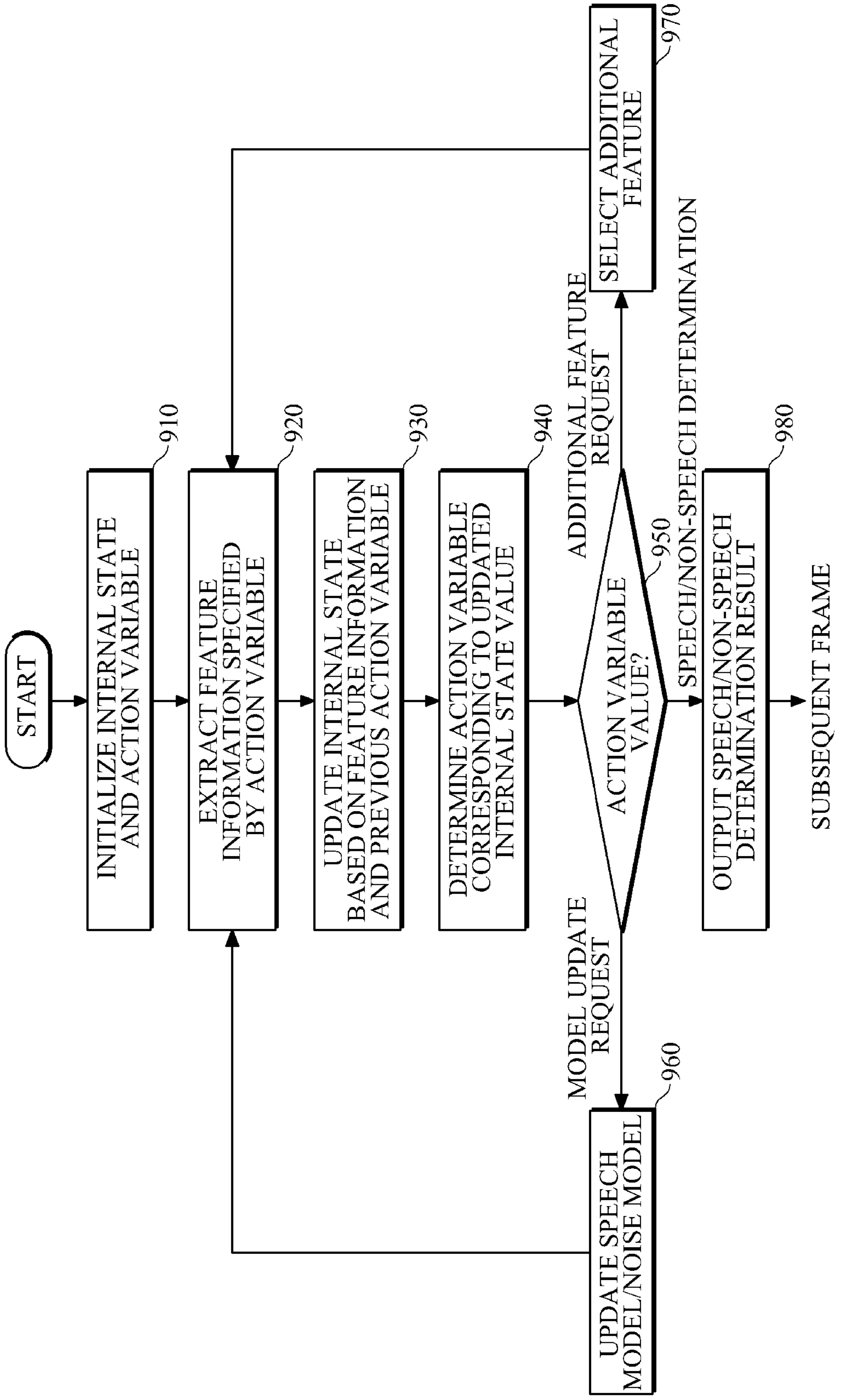
FIG. 9 is a flowchart illustrating another example of a speech detection method.

FIG. 9 is a flowchart that illustrates another example of a speech detection method.

Referring to FIG. 1 and FIG. 9, in operation 910, an internal state and an action variable are initialized to predetermined values. For example, the action variable may be set as "energy information extraction", and the internal state may be set as "P(S0=non-speech)=0.5, P(S0=speech)=0.5". If it is already known that the initial frame is always non-speech, the internal state can be set as "P(S0=non-speech)=1, P(S0=speech)=0" based on the priori probability.

In operation 920, the feature extracting unit 110 extracts feature information specified by the action variable and outputs an observation value.

In operation 930, the internal state determining unit 120 updates the internal state by applying newly extracted feature information and a previous action variable to an internal state change model and an observation distribution model.

In operation 940, the action determining unit 130 determines a new action variable based on the updated internal state value.

Thereafter, according to the action variable value in operation 950, the action determining unit 130 may request update of a speech model or a noise model to the feature extracting unit 110 to update the speech model or the noise model in operation 960. When the action variable value determined by the action determining unit 130 indicates an additional feature information request, additional feature information to be included in the action variable may be selected in operation 970, and the method returns to operation 920 such that the feature extracting unit 110 may extract additional feature information based on the action variable. When the action variable determined by the action determining unit 130 indicates determination of speech or non-speech with respect to a corresponding frame, the result of determination is output in operation 980, and the method returns to operation 920 for a subsequent frame.

As described above, the speech detection apparatus 100 includes an action variable that enables dynamic and adaptive control of the overall flow of the system to situations where a signal is input. Additionally, the speech detection apparatus 100 may determine an action variable for controlling the system, based on an internal state change model updated in accordance with a statistical probability distribution model. The feature extraction, updating of noise level, and determination of a result according to a change in internal state value do not do not need to be performed in a fixed order, and an optimal action variable may be determined based on information obtained. Accordingly, compared with a conventional speech detection method which is performed in a fixed order, the speech detection apparatus 100 is able to select an action more suitable to a particular situation.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The storage media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. The media and program instructions may be those specially designed and constructed, or they may be of the kind well-known and available to those having skill in the computer software arts. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A speech detection apparatus, comprising:

a processor;

a feature extracting unit configured to extract feature information from a frame containing audio information;

an internal state determining unit configured to determine an internal state with respect to the frame based on the extracted feature information, the internal state comprising a speech state and environment information which comprises one or more environmental factors of an input signal corresponding to the frame; and an action determining unit configured to determine, based on the internal state, an action variable indicating at least one action related to speech detection of the frame and control speech detection according to the action variable, wherein, in response to the speech state being undetermined, the action variable comprises information indicating different additional feature information to be dynamically extracted from the frame based on the internal state of the frame, and the internal state determining unit is further configured to update a value of the internal state with respect to the current frame based on an internal state change model that predicts the probability of the internal state change differently based on a type of the action variable.

2. The speech detection apparatus of claim 1, wherein:

the internal state further comprises probability information indicating whether the frame is speech or non-speech; and the action variable further comprises information indicating whether to output a result of speech detection according to the probability information or to use the feature information for speech detection of the frame.

3. The speech detection apparatus of claim 2, wherein the internal state determining unit is further configured to:

extract new feature information from the current frame using the feature information according to the action variable;

accumulate the extracted new feature information of the current frame with feature information previously extracted from the current frame; and determine the internal state based on the accumulated feature information.

4. The speech detection apparatus of claim 1, wherein, in response to the internal state indicating that the current frame is determined as either speech or non-speech, and the accuracy of the determination being above a preset threshold, the action determining unit is further configured to determine the action variable to update a data model indicating at least one of speech features of individuals and noise features, the data model being taken as a reference for extracting the feature information by the feature extracting unit.

5. The speech detection apparatus of claim 1, wherein the internal state further comprises history information for data related to speech detection.

6. The speech detection apparatus of claim 5, wherein the history information comprises at least one of information indicating a speech detection result of recent N frames and information of a type of feature information that is used for the recent N frames, where N is a natural number.

7. The speech detection apparatus of claim 1, wherein the speech state information comprises at least one of information indicating the presence of a speech signal, information indicating a type of a speech signal, and a type of noise.

8. The speech detection apparatus of claim 1, wherein the environment information comprises at least one of information indicating a type of noise background where a particular type of noise constantly occurs and information indicating an amplitude of a noise signal.

9. The speech detection apparatus of claim 1, wherein the internal state determining unit is further configured to update the internal state using at least one of a resultant value of the extracted feature information, a previous internal state for the frame, and a previous action variable.

10. The speech detection apparatus of claim 9, wherein:

the internal state determining unit is further configured to use the internal state change model and an observation distribution model in order to update the internal state;

the internal state change model indicates a change in internal state according to each action variable; and the observation distribution model indicates observation values of feature information which are used according to a value of the each interval state.

11. The speech detection apparatus of claim 1, wherein the action variable further comprises at least one of information indicating the use of new feature information different from previously used feature information, information indicating a type of the new feature information, information indicating whether to update a noise model and/or a speech model representing human speech features usable for feature information extraction, and information indicating whether to generate an output based on a feature information usage result for the frame, the output indicating whether or not the frame is a speech section.

12. The speech detection apparatus of claim 1, wherein the internal state is further determined based on a type of noise that is anticipated to be included in the frame.

13. The speech detection apparatus of claim 1, wherein the internal state change model predicts the probability of the internal state change differently based on the type of the action variable and regardless of the extracted feature information.

14. A speech detection method, comprising:

extracting feature information from a frame;

determining an internal state with respect to the frame based on the extracted feature information, wherein the internal state comprises a speech state and environment information which comprises one or more environmental factors of an input signal corresponding to the frame;

determining an action variable according to the determined internal state, the action variable indicating at least one action related to speech detection of the frame;

controlling speech detection according to the action variable; and updating a value of the internal state with respect to the current frame based on an internal state change model that predicts the probability of the internal state change differently based on a type of the action variable, wherein, in response to the speech state being undetermined, the action variable comprises information indicating different additional feature information to be dynamically extracted from the frame based on the internal state of the frame.

15. The speech detection method of claim 14, wherein the internal state further comprises probability information indicating whether the frame is speech or non-speech, and the action variable further comprises information indicating whether to output a result of speech detection according to the probability information or to use the feature information for speech detection of the frame.

16. The speech detection method of claim 14, wherein the internal state further comprises history information comprising data related to speech detection.

17. The speech detection method of claim 16, wherein the history information comprises at least one of information indicating a speech detection result of recent N frames and information of a type of feature information that is used for the recent N frames, where N is a natural number.

18. The speech detection method of claim 14, wherein the speech state information comprises at least one of information indicating the presence of a speech signal, information indicating a type of a speech signal, and a type of noise.

19. The speech detection method of claim 14, wherein the environmental information comprises at least one of information indicating a type of noise background where a particular type of noise constantly occurs and information indicating an amplitude of a noise signal.

20. The speech detection method of claim 14, wherein the determining of the internal state comprises updating the internal state using at least one of a resultant value of the extracted feature information, a previous internal state for the frame, and a previous action variable.

21. The speech detection method of claim 20, wherein, in the determining of the internal state:

the internal state change model and an observation distribution model are used to update the internal state;

the internal state change model indicates a change in internal state according to each action variable; and the observation distribution model indicates observation values of feature information that are used according to a value of the each internal state.

22. The speech detection method of claim 14, wherein the action variable further comprises at least one of information indicating the use of new feature information different from previously used feature information, information indicating a type of the new feature information, information indicating whether to update a noise model and/or a speech model representing human speech features usable for feature information extraction, and information indicating whether to generate an output based on a feature information usage result, the output indicating whether or not the frame is a speech section.

* * * * *